Patented Oct. 3, 1961

3,002,995
PURIFICATION OF SALTS OF DIALKYL ESTERS OF SULFOSUCCINIC ACID
Emil F. Williams, Old Greenwich, and Norman T. Woodberry, Stamford, Conn., assignors to American Cyanamid Company, New York, N.Y., a corporation of Maine
No Drawing. Filed Sept. 2, 1958, Ser. No. 758,608
4 Claims. (Cl. 260—481)

The present invention is directed to the purification of salts of dialkyl esters of sulfosuccinic acid, and more particularly to the purification of such salts in which each alkyl group contains from 1 to 12 carbon atoms. The products of this invention may be employed where a high degree of purity in the final product is essential, as for example, for certain pharmaceutical end uses.

The preparation of the salts contemplated for purification in accordance with this invention involves the use of well-known and long-established manufacturing techniques, and thus, a detailed description of such processes will be omitted here. In general, however, two moles of a suitable aliphatic alcohol are esterified with one mole of maleic anhydride to form the bis ester. This esterification is preferably carried out with a 5 to 10% excess of alcohol over the theoretical amount necessary to produce the bis ester, and in the presence of a small amount of an esterification catalyst, as for example, paratoluene succinic acid. In general, typical preparation procedures are described and may be found in U.S. Patent No. 2,028,091.

The bis esters thus formed are preferably concentrated and to some extent purified by vacuum distillation at a pressure of about 0.5 to 1 mm. of mercury and are then sulfonated by refluxing with an alkali metal, ammonium, or ethanolamine bisulfite in an aqueous alcohol medium. This yields a technical grade of product which ordinarily has a purity of better than about 99%, but which contains small amounts of impurities as a result of the manufacturing process, such as inorganic salts, as for example, sodium sulfonate, unreacted alcohol, hydrocarbons, ethers, and unsulfonated esters, and sulfonated monoesters. While for many purposes, a product of such purity is highly suited and no further purification is either necessary or desirable, there are applications where a substantially pure product, that is, one containing inconsequential amounts of impurities of the type described above are desirable and/or essential to a particular end use of the product.

Of particular interest in this connection are bis esters useful for pharmaceutical purposes where substantial purity is essential. A typical end use for a product of this invention is described in copending U.S. applications, Serial No. 663,909, filed June 6, 1957, now Patent No. 2,871,157, and Serial No. 668,848, filed July 1, 1957, now Patent No. 2,871,158, wherein di-n-octyl sulfosuccinic salts of high purity are described as being suitable for oral administration as laxatives and fecies softeners.

Many efforts have been made heretofore to purify bis esters of the type contemplated by the present invention by employing various techniques, most of which are generally known and normally employed for such purposes. Thus, for example, Soxhlet extraction of materials containing less than about 1% of the impurities identified hereinabove have been employed for extended periods of time, and foam fractionation at low concentrations, as for example, 2%, were each ineffective in removing impurities from the product, particularly with respect to unsulfonated esters present.

In accordance with the present invention, a process is provided for purifying members selected from the group consisting of alkali metal, ammonium, and ethanolamine salts of dialkyl esters of sulfosuccinic acid, wherein the alkyl groups contain from 1 to 12 carbon atoms each and wherein said salts contain up to about 1% of impurities, which comprises preparing a solution containing from between 2 and 15% of said salt in solvent, mixing said solution with about 1 to about 10% of a solid sorbent material on the weight of the solution, filtering the solution and drying the filtrate to recover the product.

In general terms, the essence of the present invention may be described as the removal of residual or minor amounts of impurities of the type enumerated hereinabove from salts of dialkyl esters of sulfosuccinic acid by slurry sorption technique, in which impurities are believed to be removed by adsorption and absorption.

As noted in general terms hereinabove, the dialkyl esters containing up to about 1% of impurities is made into a solution containing from between 2 and 15% concentration of the dialkyl esters in a polar solvent. The concentration of the esters in the solvent is an essential feature of the present invention in that it has been determined, as will be seen more clearly hereinafter, that the process is, in general, inapplicable where the dialkyl ester is present in non-polar solvent solution in higher amounts, as for example, 25%.

In general, it has been found that the purification process of this invention is performed on a solution having a concentration above the critical micelle concentration and up to the point where the solution becomes fully colloidal and interferes with the present purification process. By "critical micelle concentration" as that term is employed herein, it is meant the concentration range at which the surface active solution becomes predominantly colloidal. For the dialkyl esters contemplated by this invention, this concentration has been translated into concentrations varying from between about 2 and about 15%, and most perferably in concentrations of from between 5 and 10% in the polar solvent.

The solvent may be either polar or non-polar. The better known polar solvents, such as water, water alcohol mixtures, such as water methanol, water ethanol, and the like, are preferred for shorter alkyl chain lengths, as for example, those having less than 6 carbon atoms. Where solubility is a problem, as with longer alkyl chain lengths, benzene, xylene, or the like are preferably employed. For obvious economic reasons, water is greatly preferred, in that recovery problems are not encountered.

After the formation of the critically concentrated solution of bis ester in solvent, the solution is treated for purification with a solid sorbent. In general, the sorbent should be characterized by a particle size of 60 to 70% minus 325 mesh and in a 1% slurry should have a neutral or acid pH. The activated carbons are greatly preferred as sorbents. Illustrative of such materials are those sold under the tradename Darco.

In this connection, the solid sorbent is normally employed in amounts of from between about 1 and 10% by weight based on the total weight of the solution. After the addition of the sorbent, the sorbent which is in suspended form, and the dialkyl ester are thoroughly mixed, as by means of stirring, agitation or the like, for a sufficient period of time to sorb substantially all of the sorbable impurities present. This is determined empirically by analysis of the product by employing polargraphy or surface tension curve determinations. To some extent the time varies with the concentration of the ester and/or the sorbent material present and temperature.

After a thorough mixing and sorption of the impurities by and on the solid sorbent, the slurry is filtered and the purified surface active agent recovered from the filtrate or filtered solution by freeze-drying techniques or by techniques which do not employ excessive heat, which functions to decompose the product and adversely affect its final quality and purity.

The alkyl ester contemplated for purification in accordance with the present processes are those in which the alkyl groups contain from 1 to 12 carbon atoms and preferably from 4 to 8 carbon atoms. While the process appears to function with equal effectiveness regardless of the number of carbon atoms in the alkyl groups, those products in which the alkyl groups contain from 4 to 8 carbon atoms have commercially more significance, and thus it is that the present process is directed primarily to them. In particular, the present process is directed to the production of a substantially pure or a pharmaceutical grade of di-n-octyl sulfosuccinic salts, and salts of di-2-ethylhexyl sulfosuccinate.

In order that the present invention may be more fully understood, the following examples are given primarily by way of illustration. No details or enumerations contained therein should be construed as limitations on the present invention, except as they appear in the appended claims. All parts and percentages are by weight unless otherwise specifically designated.

EXAMPLE 1

A 5% concentration in water of di-isobutyl sodium sulfosuccinate was prepared.

The surface tension curve of the starting material showed a marked minimum, which could be attributed to the unsulfonated ester present (determined polargraphically to be 0.136%). This solution was thereafter treated with activated carbon (Darco G-60), using about 3% based on the total weight of solution, and thoroughly mixed for a predetermined time. Thereafter, the slurry was filtered and the surface active agent was recovered from the filtered solution by freeze drying.

The surface tension curve of the starting material displayed no marked minimum originally attributed to unsulfonated ester present, and the sorption of the material was confirmed polargraphically.

EXAMPLE 2

A 10% solution in water of di-isobutyl sodium sulfosuccinate was prepared.

A surface tension curve of the di-isobutyl sodium sulfosuccinate showed a marked minimum, which was attributed to unsulfonated ester present.

The solution was treated with 5% of activated carbon (Darco G-60) by mixing the solution thoroughly with the activated carbon. Thereafter the slurry was diluted to obtain a 5% concentration of the dialkyl ester and subjected to a second treatment with activated carbon, again employing 5% Darco G-60, based on the total weight of the solution.

Thereafter, the slurry was filtered and the di-isobutyl sodium sulfosuccinate obtained from the filtered solution by freeze-drying.

The surface tension curve of the purified di-isobutyl sodium sulfosuccinate no longer exhibited a minimum, clearly indicating that the removal of impurities was complete.

EXAMPLE 3

A 10% concentration of di-isobutyl sodium sulfosuccinate in water was prepared.

The surface tension curve of the dialkyl ester showed a minimum, which was attributed to the unsulfonated ester present.

The di-isobutyl sodium sulfosuccinate solution was then treated with 5% of activated carbon (Darco G-60) and thoroughly agitated for a predetermined time. Thereafter, the slurry was filtered and the filtered solution containing substantially purified di-isobutyl sodium sulfosuccinate was diluted to a 2.5% concentration and foam fractionated to substantially completely purify the final product. It was noted that without the activated carbon treatment, that foam fractionation was ineffective at concentrations of 2% or higher.

EXAMPLE 4

A 10% solution in benzene of sodium di-n-octyl sulfosuccinate was prepared.

The surface tension of the starting material showed a marked minimum attributed to the minor amounts of impurities present therein.

The solution was treated with 5% of activated carbon (Darco G-60) and thoroughly mixed for a predetermined time.

The slurry was then filtered and the purified sodium di-n-octyl sulfosuccinate was recovered by freeze-drying.

EXAMPLE 5

The procedure described in Example 2 hereinabove was followed, with respect to the following di-n-alkyl and branch chain sodium sulfosuccinate: di-n-butyl, di-n-amyl, di-n-hexyl, and di-2-ethylhexyl sodium sulfosuccinate, and while these materials prior to the purification process of this invention demonstrated marked minimums in their surface tension curves, after treatment in accordance with this invention, the absence of impurities was indicated by absence of changes in the minimum and slope of the surface tension curves. In addition, the high state of purity of the product was indicated by physical and chemical determinations.

Comparative Example A

A 10% solution in water of di-isobutyl sodium sulfosuccinate was prepared.

The surface tension curve of the starting material showed a marked minimum, which was attributed to unsulfonated ester present, determined polargraphically to be 0.136%.

Soxhlet extraction for 48 hours with ether was ineffective as a means of removing the unsulfonated ester present as indicated by a marked minimum in the surface tension curve of the di-isobutyl sodium sulfosuccinate so processed.

Comparative Example B

A 25% solution of di-isobutyl sodium sulfosuccinate in benzene was prepared.

The surface tension of the starting material showed a marked minimum, which was attributed to the minor amounts of the unsulfonated ester present, determined polargraphically to be 0.136%.

This solution was then treated with 5% activated carbon (Darco G-60) for a predetermined period of time. Thereafter, the slurry was filtered.

Subsequently, the product di-isobutyl sodium sulfosuccinate was obtained from the filtered solution by freeze-drying, and crystallized twice from a methyl alcohol-water solution.

The surface tension of the di-isobutyl sodium sulfosuccinate so processed contained a marked minimum attributed to the incomplete removal of the unsulfonated ester present in the starting material.

Comparative Example C

The Soxhlet extracted di-isobutyl sodium sulfosuccinate prepared as in Comparative Example A was diluted to a 2% concentration, and foam fractionated. The surface tension curve of the di-isobutyl sodium sulfosuccinate so processed continued to show a marked minimum attributed to the unsulfonated ester present.

In view of the comparative Examples A–C set forth hereinabove, and the principal examples illustrating this invention, 1–5, it will be seen that the present process provides a means in and of itself, which is simple and direct, and by which one is enabled to completely remove or substantially completely remove residual impurities from technical grade dialkyl esters contemplated by this invention. It will be further seen that the process of this invention may be used employing conventional plant equipment, and is economical to practice.

It will be further seen from the description set forth hereinabove that the slurry sorption technique described may be employed as the sole means of removal of impurities of the type to which the present invention is directed, or may be used in combination with other techniques, such as crystallization or precipitation of hydrates from non-solvent mediums therefor, such as is described in our copending application Serial No. 758,601, filed September 2, 1958, foam fractionation, Soxhlet extraction, and the like. The essential features being the concentration of the sulfosuccinic ester in the solvent solution, and the treatment of this solution with a solid sorbent material, such as activated carbon, must be an integral part of any such combined process.

As indicated above, the quality or degree of purity of the purified product prepared in accordance with the present invention, has been and may be verified by any of a number of conventional and known techniques for determining the same. Thus, for example, it is a generally accepted principle that the purity of a surface active agent is generally complete when its surface tension curve shows a definite minimum value. As noted hereinabove, products purified in accordance with this invention demonstrate no marked or definite minimum value, and as such, are considered to be substantially pure.

Thus, it has been determined in accordance with the present invention that as the impurities are removed employing the slurry sorption technique described herein, that the surface tension curve of the resulting purified product shows substantially no minimum. In accordance with this invention, measurements of surface tension by the du Nuöy ring method have been used to detect and follow the removal of the impurities during the purification of the sulfosuccinate, and have been employed to verify the substantial purity of alkyl esters so purified. This data has also been confirmed by polargraphical measurements.

While it may appear that small amounts of impurities of the type heretofore mentioned would not be harmful, it is emphasized that small amounts of impurities may adversely affect color, odor, taste, or physical form of a final product, and thus limit its use and/or preclude its use in certain specific areas. In this connection, it will be noted that sodium di-n-octyl sulfosuccinate processed in accordance with this invention is a substantially odor-free, white crystalline product, highly suited for use in oral laxative formulations. If not so purified, it would be unacceptable for such usage, because of the presence of a virtually unmaskable disagreeable odor and other attributes, which render the material unpalatable.

We claim:

1. A process for purifying members selected from the group consisting of alkali metal, ammonium, and ethanolamine salts of dialkyl esters of sulfosuccinic acid of technical grade, wherein the alkyl groups contain from 1 to 12 carbon atoms, and wherein said salts contain up to about 1% of impurities resulting from their manufacturing process, which comprises preparing a solution containing from between 2 and 15% of said salt in a solvent, mixing said solution with about 1 to 10% of activated carbon, based on the weight of the solution, filtering the solution and drying the filtrate to recover the product.

2. A process for purifying members selected from the group consisting of alkali metal, ammonium, and ethanolamine salts of dialkyl esters of sulfosuccinic acid of technical grade, wherein the alkyl groups containing from 4 to 8 carbon atoms, and wherein said salts contain up to about 1% of impurities resulting from their manufacturing process, which comprises preparing a solution containing from between 5 and 10% of said salt in a solvent, mixing said solution with about 3 to 5% of activated carbon based on the weight of the solution, filtering the solution and drying the filtrate to recover the product.

3. A process according to claim 2 wherein the salt is sodium di-n-octyl sulfosuccinate, and the solvent is benzene.

4. A process according to claim 2 wherein the salt is sodium di-2-ethylhexyl sulfosuccinate and the solvent is benzene.

References Cited in the file of this patent

UNITED STATES PATENTS

| | | |
|---|---|---|
| 2,028,091 | Jaeger | Jan. 14, 1936 |
| 2,316,234 | Flett | Apr. 13, 1943 |

OTHER REFERENCES

Mantell: Adsorption, Chem. Eng. Series, 2nd ed. (1951), page 128.

Zimmerman et al.: Handbook of Material Trade Names, page 161 (1953).